(12) United States Patent
Narayan-Sarathy et al.

(10) Patent No.: US 7,317,061 B2
(45) Date of Patent: Jan. 8, 2008

(54) SELF-PHOTOINITIATING WATER-DISPERSIBLE ACRYLATE IONOMERS AND SYNTHETIC METHODS

(75) Inventors: Sridevi Narayan-Sarathy, Dublin, OH (US); Robert B. Fechter, Worthington, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 201 days.

(21) Appl. No.: 10/834,056

(22) Filed: Apr. 29, 2004

(65) Prior Publication Data

US 2005/0245711 A1   Nov. 3, 2005

(51) Int. Cl.
*C08F 120/10* (2006.01)
*C08F 226/02* (2006.01)

(52) U.S. Cl. .................. 526/317.1; 526/302; 526/319; 526/458

(58) Field of Classification Search ................ 526/302, 526/319, 317.1, 458; 525/458
See application file for complete search history.

(56) References Cited

U.S. PATENT DOCUMENTS

| | | | |
|---|---|---|---|
| 5,496,896 A * | 3/1996 | Alfons | 525/74 |
| 5,945,489 A | 8/1999 | Moy et al. | |
| 5,969,046 A * | 10/1999 | Schindler et al. | 525/108 |
| 6,025,410 A * | 2/2000 | Moy et al. | 522/182 |
| 6,706,414 B1 | 3/2004 | Dammann et al. | |

OTHER PUBLICATIONS

Norbert Moszner et al. "Reaction behaviour of monomeric β-ketoesters, 4[a)] Polymer network formation by Michael reaction of multifunctional acetoacetates with multifunctional acrylates", Macromol. Rapid Commun, 16, pp. 135-138 (1995). Hüthig & Wepf Verlag, Zug.

* cited by examiner

*Primary Examiner*—David W. Wu
*Assistant Examiner*—M. Bernshteyn
(74) *Attorney, Agent, or Firm*—Connolly Bove Lodge & Hutz LLP (57) ABSTRACT

The invention detailed herein comprises a family of novel multifunctional acrylate ionomeric resins, which are water-dispersible, and have built-in photoinitiator. The inventive resins are made self-photoinitiating by their reaction with β-keto esters (e.g., acetoacetates), β-diketones (e.g., 2,4-pentanedione), β-keto amides (e.g., acetoacetanilide, acetoacetamide), and/or other β-dicarbonyl compounds that can participate in the Michael addition reaction as "Michael donors." These water-dispersible resins cure under standard ultraviolet (UV) cure conditions to give tack-free coatings without the addition of traditional photoinitiators. The present invention further relates to the use of these resins in coatings.

30 Claims, 3 Drawing Sheets

SELF-PHOTOINITIATING WATER-DISPERSIBLE ACRYLATE IONOMERS AND SYNTHETIC METHODS

FIELD OF THE INVENTION

The invention detailed herein comprises a family of novel multifunctional acrylate ionomeric resins, which are water-dispersible, and have built-in photoinitiator. The inventive resins are made self-photoinitiating by their reaction with β-keto esters (e.g., acetoacetates), β-diketones (e.g., 2,4-pentanedione), β-keto amides (e.g., acetoacetanilide, acetoacetamide), and/or other β-dicarbonyl compounds that can participate in the Michael addition reaction as "Michael donors." These water-dispersible resins cure under standard ultraviolet (UV) cure conditions to give tack-free coatings without the addition of traditional photoinitiators. The present invention further relates to the use of these resins in coatings.

BACKGROUND

The information provided below is not admitted to be prior art to the present invention, but is provided solely to assist the understanding of the reader.

A drawback to the use of initiators or photoinitiators is the production of volatile low molecular weight fragments that may not be environmentally safe.

These resins are characterized by the presence of acrylate groups as pendant moieties and by the ability of these resins to cure under standard UV-cure conditions to give tack-free coatings without the addition of traditional photoinitiators.

Multifunctional acrylates and methacrylates ("acrylates") are commonly utilized in the preparation of crosslinked films, adhesives, foundry sand binders, composite structures, and other materials. Acrylate monomers and oligomers may be crosslinked by free radical chain mechanisms, which may require any of a number of free radical generating species, such as peroxides, hydroperoxides, or azo compounds, that may decompose to form radicals either when heated, or at ambient temperatures in presence of promoters.

An alternative means of initiating reaction is the use of ultraviolet (UV) light or electron beam (EB) radiation to decompose photoinitiators to free radicals. For numerous applications, this method offers the potential of extremely rapid processing because the transformation from a liquid reactive composition to a crosslinked solid is essentially instantaneous upon exposure to UV or EB radiation.

A drawback to the use of initiators to effect free radical reaction, is that the decomposition of initiators and photoinitiators produces low molecular weight fragments that may volatilize during and/or after the manufacturing process. Fugitive emissions create safety issues regarding workers, consumers, and the environment. For instance, these low molecular weight fragments tend to be readily absorbed through skin which can cause adverse health effects.

These limitations have been addressed in several key approaches. The challenge of fugitive emissions during manufacturing processes or subsequent leaching of photoinitiator fragments has been attacked by creating acrylate monomers/oligomers with "built-in" photoinitiators. This may be accomplished by starting with a compound which is known to function as a photoinitiator (or a suitable derivative) and either functionalizing it with an appropriate unsaturated group, i.e. acrylate or methacrylate, so as to produce a new compound which functions as both monomer/oligomer and photoinitiator, or by "grafting" onto a preformed oligomer/polymer in order to produce a higher molecular weight photoinitiator.

Regardless of the effectiveness of these methods, they add additional manufacturing procedures and costs.

Moreover, these approaches result in resins of low functionality. Low functionality is detrimental to reactivity and final properties, and may impose a requirement for external catalyst or initiator to effect crosslinking.

Figure 1:
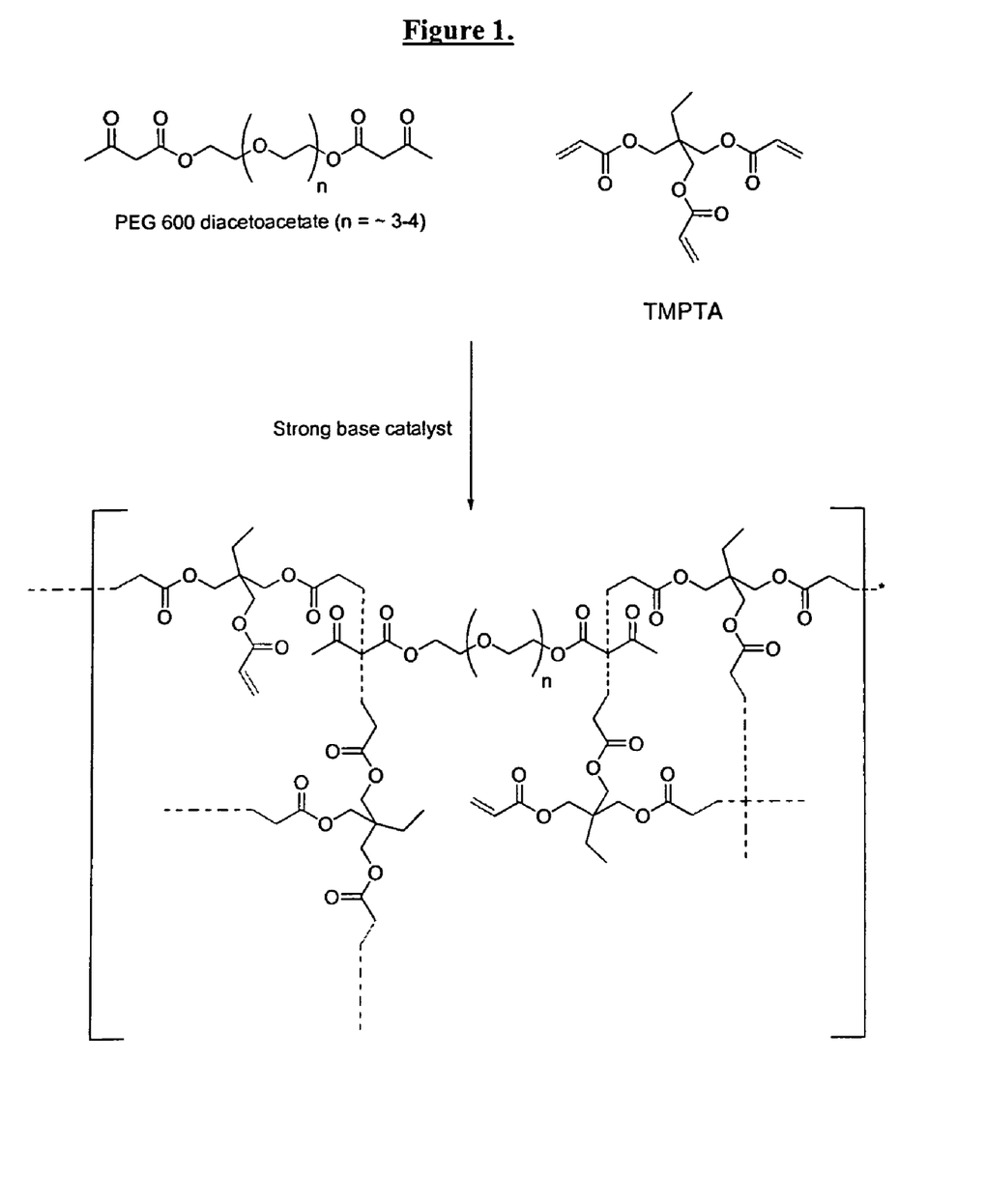
FIG. 1 is a schematic of a representative crosslinked Michael addition resin.

The photo-polymerizable units of the ionic, UV-curable resins of the present invention are provided by the Michael addition of β-dicarbonyl compounds to acrylate acceptors. The Michael addition of acetoacetate donor compounds to multi-functional acrylate receptor compounds to make crosslinked polymers has been described in the literature. For example, Mozner and Rheinberger reported the Michael addition of acetoacetates to triacrylates and tetracrylates. (Macromolecular Rapid Communications, 16, 135-138 (1995)). The products formed were crosslinked gels. In one such reaction, depicted in FIG. 1, Mozner added one mole of trimethylol propane triacrylate (TMPTA) having three functional groups to one mole of polyethylene glycol (600 molecular weight) diacetoacetate (PEG600-DAA) having two functional groups. (Each acetoacetate "functional group" reacts twice, thus each mole of diacetoacetate has four reactive equivalents.) The resulting network is considered "gelled", or cured, despite the presence of unreacted acrylic functional groups. While further reaction can be promoted, this network cannot be made liquid either with heat or solvent because it is effectively crosslinked.

A more recent and effective solution is described in U.S. Pat. Nos. 5,945,489 and 6,025,410 to Moy et al and assigned to Ashland, Inc., the assignee of the present application. Such approach involves reacting multifunctional acrylates with acetoacetates via Michael Addition in ratios that yield uncrosslinked, acrylate-functional resins. These resins crosslink upon exposure to an appropriate UV source in the absence of added photoinitiators.

Ultraviolet (UV)-curable waterborne coatings are interesting because of their advantages of environmental protection, lower energy consumption, high curing speed, rheological control, and adaptation to spraying. Conventionally, curable aqueous dispersions are obtained by either extra-emulsification or self-emulsification. Self-emulsification of acrylate ionomers is achieved by introducing hydrophilic ionic groups into the backbone of curable resins. A balance between dispersibility and water resistance can be achieved by incorporating some polyethylene oxide segments into the backbone of the ionic curable resin.

There exists a need for water-dispersible, UV-curable resins that incorporate the advantages of self-photoinitiation common to Michael resins.

SUMMARY OF INVENTION

The invention detailed herein describes the synthesis of water-dispersible, un-gelled, self-photoinitiating acrylate ionomers by combining Michael addition technology with conventional acrylate ionomer synthesis.

The present invention provides ionic, UV-curable multifunctional acrylate Michael resins. In a first embodiment, illustrated in FIG. 2, an ionic moiety is incorporated into the resin as a part of at least one isocyanate-reactive, hydrophilic monomer polymerized into the resin backbone. Isocyanate-reactivity is conferred by the incorporation of at least one chemical moiety selected from the group consisting of hydroxyl, primary amine, secondary amine, and thiol. The ionic character of the monomer is conferred by at least one chemical moiety selected from the group consisting of carboxylate, sulfonate, ammonium, quaternary ammonium, and sulfonium. Carboxylate and sulfonate moieties render the ultimate resins anionic. Whereas, ammonium, quaternary ammonium, and sulfonium render the ultimate resins cationic.

Figure 3:
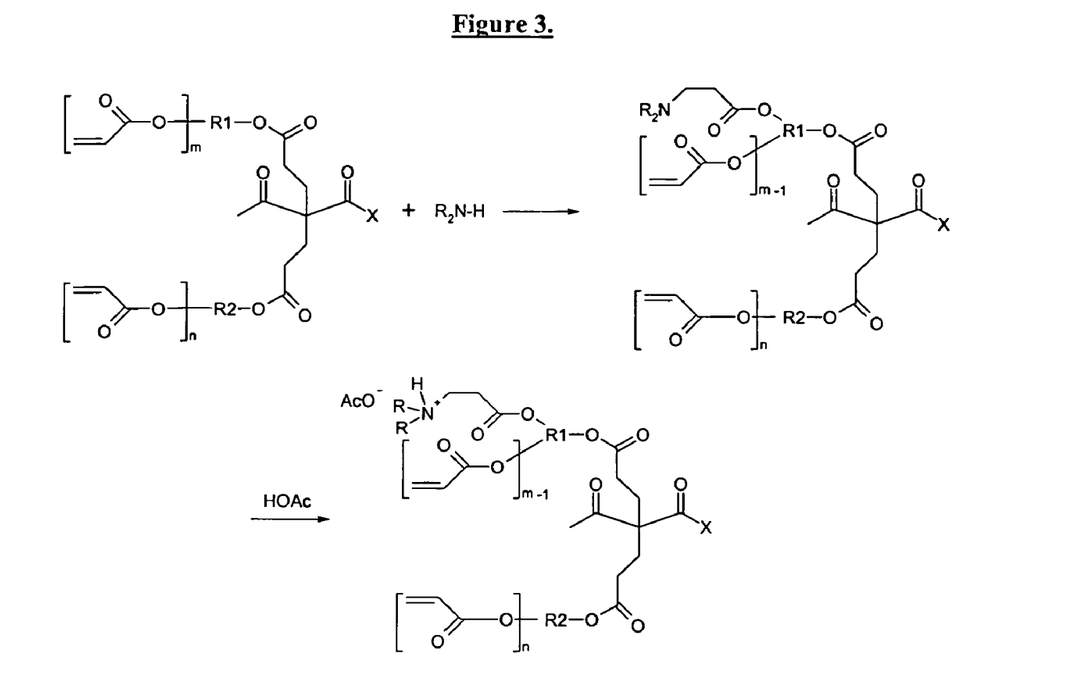
FIG. 3 is a schematic of a representative pendant tertiary amine Michael multifunctional acrylate oligomer, and of the cationomer, the carboxylic acid salt thereof.

A second cationic embodiment of the present invention, illustrated in FIG. 3, incorporates a tertiary amine as part of a chain pendent from the resin backbone.

The present invention provides oligomers used to synthesize the inventive resins. The present invention provides a backbone-ionic, isocyanate-terminated, urethane oligomer (FIG. 2A) formed from a hydrophilic monomer described above and at least one isocyanate-terminated urethane oligomer. Each isocyanate-reactive functional group of the hydrophilic monomer is urethane-linked to an isocyanate-terminated urethane oligomer.

Figure 2A:
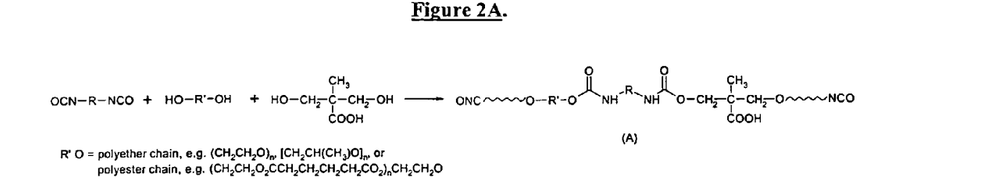
FIG. 2A is a schematic synthesis of a representative carboxylic acid-functionalized isocyanate end-capped urethane oligomer.
Figure 2B:
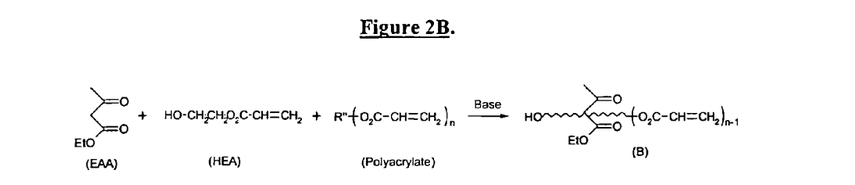
FIG. 2B is a schematic synthesis of a representative hydroxy-functional Michael addition multifunctional acrylate oligomer.

The present invention provides hydroxy-functional, acrylated Michael oligomers (FIG. 2B). The inventive Michael oligomer is synthesized from a β-dicarbonyl compound, a hydroxy-functional acrylate and a multifunctional acrylate ester.

Figure 2C:
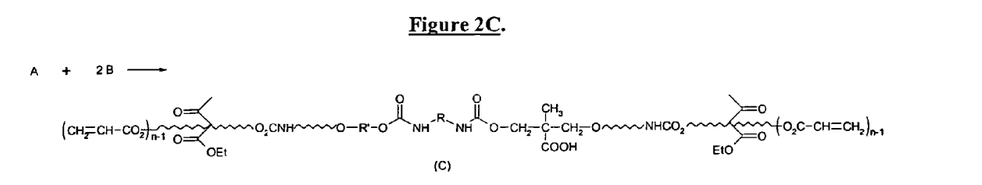
FIG. 2C is a schematic synthesis of a carboxylic acid-functionalized urethane acrylate Michael addition oligomer representative of the backbone-ionic resins of the present invention.

Each isocyanate termination of the backbone-ionic, isocyanate-terminated, urethane oligomer (FIG. 2A) is bound in urethane linkage with a hydroxy-functional, acrylated Michael oligomer (FIG. 2B) to form the inventive backbone-ionic, multifunctional acrylate Michael resins (FIG. 2C).

An aspect of the present invention provides pendent-ionic Michael addition multifunctional acrylate oligomers comprising a β-dicarbonyl monomer having a central methylene carbon; first and second multifunctional acrylate monomers Michael added to the methylene carbon, wherein a portion of the pendant acrylate moieties are reacted with a secondary amine yielding tertiary amine groups (FIG. 3).

Figure 2D:
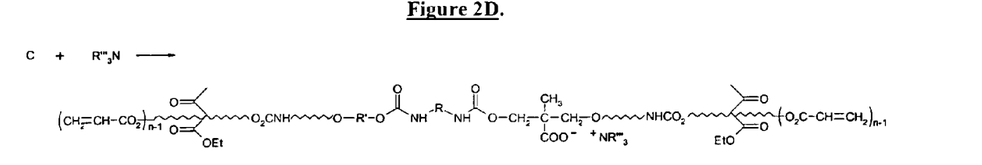
FIG. 2D is a schematic of a backbone-ionic anionomer, representing the trialkylammonium salt of the resin of FIG. 2C.

The anionic Michael resins of the present invention may be dispersed in water as their trialkylammonium salt (FIG. 2D). Cationic resins from both routes 2 and 3 may be dispersed in water as acetate or formate salts (FIG. 3).

The present invention provides an ionomeric Michael addition resin admixed with an amount of water.

The present invention provides that water dispersions of the inventive ionomeric Michael addition resin compositions may be further admixed with at least one additive selected from the group consisting of pigments, gloss modifiers, flow and leveling agents, and other additives as appropriate to formulate coatings, paints, laminates, sealants, adhesives, foundry sand binders, and inks.

An aspect of the present invention provides a method of using the inventive resins comprising applying the resin to a substrate, drying the resin, and curing the resin. Cure can be achieved by exposure to actinic light or electron beam radiation, either in the presence, or preferably in the absence of exogenous photo-initiators. Cure may also be achieved through the use of traditional free radical generators.

An aspect of the present invention provides a polymerized product comprising an ionomeric Michael addition resin composition cured with a free radical generator. A further aspect of the present invention provides a substrate coated with an ionomeric Michael addition resin composition.

A further aspect of the present invention provides a method of synthesizing a backbone-ionic isocyanate end-capped urethane oligomer comprising providing a resin reactor having a dry atmosphere; providing a polyol to said reactor; providing a hydrophilic monomer having at least one isocyanate-reactive moiety to said reactor; providing a solvent to said reactor; providing a urethanation catalyst to said reactor; adding a multi-functional isocyanate; and maintaining the reaction mixture at a reaction-effective temperature.

An aspect of the present invention provides that the pendant tertiary amine groups of the inventive resins can function as amine synergists to promote cure of the resin.

An aspect of the present invention provides that the inventive, water-dispersible ionomeric compositions cure, under standard UV-cure conditions, to yield tack-free coatings without the addition of traditional photoinitiators.

According to an aspect of the present invention, a polymerized product is provided. The polymerized product may be any of coatings, paints, laminates, sealants, adhesives, foundry sand binders, inks, or other product depending on the nature of the inventive ionomer and of the additive or additives that may be included in the final composition. Suitable additives may be selected from the group consisting of pigments, gloss modifiers, flow and leveling agents, and other additives as appropriate to the desired formulation.

According to an aspect, the present invention provides methods of using the resins and ionomers of the present invention comprising applying the ionomers to a substrate, drying, and curing the resins. Application may be made by any process known to the industry, including, but not limited to; roll-coating, spray-coating, brush-coating, dip-coating, and electro coating.

According to an aspect of the present invention, a method of using the inventive ionomer is provided. According to an aspect of the present invention, the inventive ionomer is applied to a surface and cured with actinic light in the absence of traditional photoinitiators. According to an aspect of the present invention, the inventive ionomer is mixed with an external photoinitiator, applied to a surface, and cured with actinic light. According to an aspect of the present invention, the inventive ionomer is mixed with a peroxide or azo-type initiator, applied to a surface, and cured using thermal energy in the presence or absence of actinic light.

According to an aspect of the present invention, the inventive ionomer is mixed with a suitable additive selected from the group consisting of pigments, gloss modifiers, flow and leveling agents, and other additives as appropriate to the desired formulation, applied to a surface, dried, and cured.

DETAILED DESCRIPTION OF A PREFERRED EMBODIMENT

Examples are provided in the next section to illustrate details of the synthesis of these novel materials as well as their application in coatings. Specific reaction conditions and reaction parameters for any liquid oligomeric resin given in the examples are not limiting for the invention.

The term monomer is herein defined as a molecule or compound, usually containing carbon and of relatively low molecular weight and simple structure, which is capable of conversion to oligomers, polymers, synthetic resins, or elastomers by combination with other similar and/or dissimilar molecules or compounds.

The term oligomer is herein defined as a polymer molecule consisting of only a few similar and/or dissimilar monomer and/or oligomer units.

The term resin is herein defined as an oligomer, which is capable of conversion to high molecular weight polymers by combination with other similar and/or dissimilar molecules or compounds.

The term thermoset is herein defined to be a high molecular weight polymer product of resins that solidifies or sets irreversibly when heated. This property is associated with crosslinking reactions of the molecular constituents induced by heat, radiation, and/or chemical catalysis.

The term "polyol" refers to a polyhydric alcohol having at least two hydroxyl groups. The present invention comprehends polyols to include diols. A terminal diol is any polyol in which the terminal portions of the molecule are hydroxylated.

The term "hydrophilic monomer," refers to any monomer having at least one ionic moiety. An ionic moiety is a chemical grouping that is either intrinsically charged, or, may become charged by binding or dissociating an ion in aqueous solution.

An aspect of the invention provides water-dispersible acrylate ionomeric compositions. As herein defined, the term "ionomer" refers to an ion-containing oligomer consisting of ionic and nonionic monomer units. The term "ionomer" further refers to a polymer synthesized from ionic and nonionic oligomers. An aspect of the invention provides water-dispersible acrylate oligomers and compositions containing said oligomers. The oligomers of the present invention are synthesized from a combination of ionic and nonionic monomers. In the appropriate context, the terms "ionomer" and "ionomeric" refer to those oligomers that incorporate at least one ionic monomer. A further aspect of the present invention provides polymeric coatings polymerized from the ionomeric oligomers of the present invention. In the appropriate context, the terms "ionomer" and "ionomeric" refer to polymers polymerized from at least one ionomeric oligomer.

An aspect of the present invention provides anionic and cationic ionomers, both oligomers and polymers. An "anionomer" is an oligomer or a polymer that contains a chemical group bearing a negative electrical charge. A "cationomer" is an oligomer or a polymer that contains a chemical group bearing a positive electrical charge.

An aspect of the present invention provides a water-dispersible, UV-curable, oligomeric, multifunctional acrylic Michael resin composition comprising a urethane acrylate, obtained by the reaction of a backbone-ionic functionalized isocyanate end-capped urethane oligomer with —OH-containing, self-photoinitiating Michael addition oligomers.

An embodiment of the present invention provides anionomers wherein the backbone is synthesized from hydrophilic monomers that include carboxylate or sulfonate groups. An embodiment provides cationomers wherein the backbone is synthesized from hydrophilic monomers that include ammonium, quaternary amine, or sulfonium groups.

A preferred embodiment of the present invention provides anionomers wherein the isocyanate-reactive, hydrophilic monomer incorporated into the resin backbone is a carboxylic acid.

FIG. 2A presents a schematic of the synthesis of a representative carboxylic acid-functionalized isocyanate end-capped urethane oligomer used to synthesize the anionomeric resins of the present invention. The figure shows a hydroxy-functional carboxylic acid and a polyether or polyester polyol reacted with a stoichiometric excess of multifunctional isocyanate molecules.

The isocyanate-reactive, hydrophilic monomer of the present invention has at least one, but may have more than one, isocyanate-reactive moiety. Non-limiting isocyanate-reactive moieties include hydroxyl, primary amine, secondary amine, and thiol. Hydroxyl is preferred. In addition to isocyanate-reactive moieties, the hydrophilic monomer has ionic moieties. A suitable hydrophilic monomer has at least one, preferably has at least two, but may have more than two ionic functionalities.

A preferred ionic functionality is an acid. An especially preferred acid is a carboxylic acid. A preferred carboxylic acid monomer is dimethylolpropionic acid. Suitable, non-limiting, hydrophilic monomers include bis(hydroxymethyl) butyric acid, N,N-bis(2-hydroxyethyl)glycine, hydroxypivalic acid, malic acid, glycolic acid, and lactic acid.

The isocyanate-terminated urethane oligomer is formed from a central polyol monomer and at least two polyisocyanate monomers. Preferably, the polyol is a terminal diol. Where the polyol has more than two hydroxyl groups, it may react with more than two polyisocyanate monomers to form a branched structure having a plurality of isocyanate terminations. A first isocyanate termination of the oligourethane forms a urethane linkage with one of the isocyanate-reactive moieties on the hydrophilic monomer. Where the hydrophilic monomer has more than one isocyanate-reactive moiety, each moiety is urethanated by a polyisocyanate-terminated urethane oligomer.

A hydroxylated, acrylate-terminated Michael oligomer is urethane-linked to each isocyanate-terminated urethane oligomer. The Michael oligomer is formed from three monomer units. A first monomer is a β-dicarbonyl molecule which has a central methylene carbon. A hydroxyacrylate monomer and a multifunctional acrylate monomer are Michael added to the methylene carbon.

The polyol moiety of the acid-functionalized isocyanate-terminated urethane oligomer may be a polyether polyol, a polyester polyol, or a mixture of polyols. It is preferred that the polyol have a molecular weight in the range of from about 200 to about 5000. More preferably, the polyol has a molecular weight of 1000 to 2000 AMU. The molecular weight of the urethane oligomer is largely a function of the molecular weight of the polyol spacer and of the number of such spacers incorporated into each oligomer.

The polyol may be an alkanediol or a cycloalkanediol. Non-limiting examples include ethanediol, 1,2- and 1,3-propanediol, 1,2-, 1,3- and 1,4-butanediol, 1,5-pentanediol, 1,6-hexanediol, neopentyl glycol, 1,4-cyclohexanedimethanol, 1,2- and 1,4-cyclohexanediol and 2-ethyl-2-butylpropanediol. Also suitable are diols containing ether or ester groups such as diethylene glycol, triethylene glycol, tetraethylene glycol, dipropylene glycol, tripropylene glycol, and polyethylene glycols, polypropylene glycols, polybutylene glycols or poly(ethylene glycol adipate)s having a maximum molecular weight of about 5000, preferably about 2000 and more preferably about 1000. Reaction products of these diols with a lactone, such as ε-caprolactone, may also be used as diols. A preferred polyol is poly(neopentyl glycol adipate).

The polyol may be a tri- or higher functional alcohol, such as glycerol, trimethylolpropane, pentaerythritol, dipentaerythritol and sorbitol or polyethers started on these alcohols, for example, the reaction product of 1 mole of trimethylolpropane with 4 moles of ethylene oxide As non-limiting examples of the present invention, carboxylic acid-functionalized isocyanate end-capped urethane oligomers were synthesized from polyether or polyester polyols having number average molecular weights ($M_n$) in the range of from about 200 to about 2000 MW.

Carboxylic acid-functionalized isocyanate end-capped urethane oligomers, exemplary of the present invention, were synthesized from aliphatic diisocyanates in order to minimize absorbance of ultraviolet (UV) light by chromophores other than the built-in photoinitiator during cure of the resin. However, aliphatic, cycloaliphatic, or aromatic polyisocyanates may be used. Preferred aliphatic diisocyanates include, but are not limited to, dicyclohexylmethane diisocyanate, isophorone diisocyanate (IPDI), 2,2,4-trimethylhexamethylene diisocyanate (TMDI), hexamethylene diisocyanate (HDI), hexamethylene diisocyanate trimer (HDT), and IPDI trimer.

FIG. 2B is a schematic of the synthesis of a hydroxyl-containing Michael addition oligomer. A β-dicarbonyl Michael donor is reacted with equimolar amounts of a hydroxy-functional acrylate monomer and a-multifunctional acrylate monomer or oligomer in the presence of a strong base. The synthesis of hydroxy-functional acrylate Michael addition oligomers is disclosed in co-pending application (serial number not yet assigned, the entire contents of which is hereby incorporated by reference and for all purposes.

In a preferred embodiment, the β-dicarbonyl Michael donor is a β-ketoester (e.g., ethyl acetoacetate). Suitably, the present invention may also be practiced with a β-diketone (e.g., 2,4-pentanedione), a β-ketoanilide (e.g., acetoacetanilide), a β-ketoamide (e.g., acetoacetamide), or a mixture of Michael donors according to the desired resin quality and end use. In preferred embodiments of the present invention, the β-dicarbonyl has functionality (N) wherein N=2. β-Dicarbonyl donors of higher functionality (i.e., N=4, 6 . . . ) are suitable, but more careful control of reaction stoichiometry must be exercised to avoid unwanted system gelation.

Suitable β-dicarbonyl donor compounds having functionality=2 include, but are not limited to: ethyl acetoacetate, methyl acetoacetate, 2-ethylhexyl acetoacetate, lauryl acetoacetate, t-butyl acetoacetate, acetoacetanilide, N-alkyl acetoacetanilides, acetoacetamide, 2-acetoacetoxyethyl acrylate, 2-acetoacetoxyethyl methacrylate, allyl acetoacetate, benzyl acetoacetate, 2,4-pentanedione, isobutyl acetoacetate, and 2-methoxyethyl acetoacetate.

Suitable β-dicarbonyl donor compounds having functionality=4 include, but are not limited to: 1,4-butanediol diacetoacetate, 1,6-hexanediol diacetoacetate, neopentyl glycol diacetoacetate, cyclohexane dimethanol diacetoacetate, and ethoxylated bisphenol A diacetoacetate.

Suitable β-dicarbonyl donor compounds having functionality=6 include, but are not limited to: trimethylol propane triacetoacetate, glycerin triacetoacetate, and polycaprolactone triacetoacetates.

A preferred, but not limiting, β-dicarbonyl donor compound having functionality=8, is pentaerythritol tetraacetoacetate.

Preferred hydroxy-functional acrylates include, but are not limited to: 2-hydroxyethyl acrylate (HEA), 4-hydroxybutyl acrylate, caprolactone acrylate, propylene glycol monoacrylate, polyethylene glycol monoacrylate, polypropylene glycol monoacrylate, and mixtures thereof.

Suitable multifunctional acrylate Michael acceptors are chosen from among diacrylates, triacrylates, tetraacrylates, and pentaacrylates. The range of β-dicarbonyl donors and multifunctional acrylate acceptors affords the composition designer the opportunity to exercise a great range of selectivity in the properties of the final product.

Preferred diacrylates include, but are not limited to: ethylene glycol diacrylate, propylene glycol diacrylate, diethylene glycol diacrylate, dipropylene glycol diacrylate, triethylene glycol diacrylate, tripropylene glycol diacrylate, tertraethylene glycol diacrylate, tetrapropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, epoxy diacrylate, aryl urethane diacrylate, aliphatic urethane diacrylate, polyester diacrylate, and mixtures thereof.

Preferred triacrylates include, but are not limited to: trimethylol propane triacrylate, glycerol triacrylate, ethoxylated trimethylolpropane triacrylate, propoxylated trimethylolpropane triacrylate, tris (2-hydroxyethyl)isocyanurate triacrylate, ethoxylated glycerol triacrylate, propoxylated glycerol triacrylate, pentaerythritol triacrylate, aryl urethane triacrylates, aliphatic urethane triacrylates, melamine triacrylates, epoxy novolac triacrylates, aliphatic epoxy triacrylate, polyester triacrylate, and mixtures thereof.

Preferred tetraacrylates include, but are not limited to: di-trimethylolpropane tetraacrylate, pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetraacrylates, aliphatic urethane tetraacrylates, melamine tetraacrylates, epoxy novolac tetraacrylates, and mixtures thereof.

Preferred pentaacrylates include, but are not limited to: dipentaerythritol pentaacrylate, melamine pentaacrylate, and mixtures thereof.

The Michael addition reaction is catalyzed by a strong base. A preferred base is diazabicycloundecene (DBU), which is sufficiently strong and is readily soluble in the monomer mixtures. Other cyclic amidines, for example diazabicyclo-nonene (DBN) and guanidines are also suitable for catalyzing this polymerization. Group I alkoxide bases such as potassium tert-butoxide, provided they have sufficient solubility in the reaction medium, are typically adequate to promote the desired reaction. Quaternary hydroxides and alkoxides, such as tetrabutyl ammonium hydroxide or benzyltrimethyl ammonium methoxide, comprise another class of preferred base catalysts to promote the Michael addition reaction. Finally, strong, organophilic alkoxide bases can be generated in situ from the reaction between a halide anion (e.g., quaternary halide) and an epoxide moiety. Such in situ catalysts are disclosed in pending application Ser. No. 10/255,541 assigned to Ashland, Inc., the assignee of the present application. The entire contents of application Ser. No. 10/255,541 is specifically incorporated by reference in its entirety and for all purposes.

FIG. 2C sketches the synthesis of a carboxylic acid-functionalized urethane acrylate, a non-limiting exemplar of the present invention. Each terminal isocyanate group of a carboxylic acid-funtionalized isocyanate end-capped urethane oligomer, from FIG. 2A, is reacted to form a urethane link with one equivalent of a hydroxyl group-containing Michael addition oligomer, from FIG. 2B.

The isocyanate addition reaction may be accelerated by addition of a suitable catalyst, including, but not limited to triethylamine, 1,4-diazabicyclo[2.2.2]octane, tin dioctoate or dibutyltin dilaurate. Preferred catalysts include tin dioctoate and dibutyltin dilaurate.

The invention further provides pendent cationic acrylate oligomers comprising an ungelled, uncrosslinked Michael addition oligomer having pendant acrylic functional groups, wherein a portion of said groups are derivatized with a secondary amine. The secondary amine may be a dialkyl amine, dialkenyl amine, cycloaliphatic amine, heterocyclic anine, functionalized secondary amine, and compounds with a plurality of secondary amine functional groups, such as piperazine. The secondary amine may comprise a nitrogen covalently linked to two organic radicals, wherein each radical is selected from the group consisting of linear and branched alkyl, linear and branched alkenyl, and linear and branched alkynyl. The two carbon radicals may cyclize with the nitrogen to form a heterocyclic ring.

A further embodiment of the present invention provides oligomers in which at least one ionic group is attached by a chain pendant from the oligomer backbone. FIG. 3 shows the synthesis of a representative pendant tertiary amine-containing Michael addition multifunctional acrylate oligomer. The oligomer comprises a β-dicarbonyl monomer having a central methylene carbon and first and second multifunctional acrylate monomers Michael added to the carbon. Each incorporated multifunctional acrylate monomer residue has at least one pendant acrylate group.

Suitable and preferred β-dicarbonyl monomers are as described above for backbone-ionic resins.

Suitable and preferred multifunctional acrylate monomers are as described above for backbone-ionic resins.

The Michael addition reaction is as described above.

The cationomer is formed as sketched in FIG. 3. A pendant tertiary amine Michael addition multifunctional acrylate oligomer is admixed with an acid to form a salt thereof. At least about 1 equivalent of water-compatibilizing acid is mixed with the pre-cationic oligomer for neutralizing the amine groups. Non-limiting examples of suitable proton donating organic and inorganic acids include phosphoric, sulfuric, hydrochloric, acetic, formic, and lactic. A preferred acid is a carboxylic acid. Non-limiting, preferred carboxylic acids include formic and acetic. Preferred acids are those (such as, but not limited to, formic and acetic acids) that readily volatilize from the emulsion as it is dried. This yields a neutral cured resin coating that has good water resistance.

The invention comprehends bridged forms of the resin of FIG. 3 linked through a common tertiary amine nitrogen atom. Two equivalents of the resin of FIG. 3 are reacted with one equivalent of a primary amine. A pendant acrylate moiety from each resin unit adds to the primary amine to form a tertiary amine. The invention comprehends higher-order oligomers. As the ratio of primary amine to resin is varied, a mixture of bridged lower- and higher-order oligomers may be formed.

In an embodiment, ionomers are formed from the resins by combining with a counter-ion in an aqueous solution. Water and counter-ion may be added in any order. As appropriate to the charge of the resin, a counter-ion may come from a weakly basic tertiary amine ($pK_b$ of from about 2.5 to about 9.0) or a weak acid ($pK_a$ of from about 5.0 to about 3.0), such as formic or acetic. Preferably, the counter-ion is readily able to dissociate or associate with other ions present to form neutral, volatile compounds at the operating temperatures commonly associated with the anticipated use of the resins. Persons of skill in the chemical arts readily appreciate that Kovats index is a descriptor relating to the molecular size and boiling point of a compound and therefore, the index is a measure of the relative volatility of a compound. Persons of skill recognize that determination of Kovats index is simply performed by gas chromatography.

The inventive ionomers are dispersed in water at a solids loading of from about 10% to about 75% prior to application to a substrate. A preferable loading is from about 20% to about 60%. A more preferred loading is from about 30% to about 40%. The loadings are calculated on a weight basis. After application, the ionomers may be dried and cured.

The inventive resins may be admixed with at least one additive selected from the group consisting of pigments, gloss modifiers, flow and leveling agents and other additives as appropriate to formulate coatings, paints, laminates, sealants, adhesives, foundry sand binders, and inks.

The properties of the inventive ionomeric systems may be engineered by tailoring the reactants. The Michael donor and the multifunctional acrylate monomer may be varied in conjunction with a hydroxylated (—OH containing) acrylate such as 2-hydroxyethyl acrylate (HEA) for the synthesis of —OH containing Michael addition oligomer. The molecular weight of the polyol, its molecular composition, the stoichiometry of the hydrophilic monomer, and the type of multifunctional isocyanate used in the reaction also regulate the properties of the final material. The ability of these materials to form tack-free coatings with good properties in absence of photo-initiator has also been demonstrated.

EXAMPLES

Ultraviolet light photo-polymerization was demonstrated by applying a portion of the inventive composition to a surface. The composition was spread over the surface to a thickness of up to about 3 mils. The resins were applied to aluminum or stainless steel substrates by the "draw down" technique. Specimens were cured with a Fusion Systems Corp. UV curing unit using a 600-watt H-bulb and a belt-speed of 40 feet/minute which delivers a UV dosage of ~840 $mJ/cm^2$.

Coating performance properties were measured by a variety of different test methods familiar to persons of skill in the art.

Solvent Resistance. Solvent resistance is the ability of a coating to resist solvent attack or film deformity. Rubbing the coating with a cloth saturated with an appropriate solvent is one way to assess when a specific level of solvent resistance is achieved. Rubbing tests were conducted using either methyl ethyl ketone (MEK) or water (as indicated) and employed a double rub technique, one complete forward and backward motion over the coated surface. To normalize test strokes, cheesecloth was fixed to the round end of a 16-oz. ball peen hammer. The double rub technique utilizes the weight of the hammer as the operator holds the hammer at the base of the handle. This test was performed until the double rubbing action cut into the film or a noticeable film disorder was evident. The method is modified from the procedure of ASTM D4752.

Adhesion testing was performed by the crosshatch method on rigid substrates using a modified method of ASTM D3359 by Test Tape Method B, using a 6-bladed cutting tool with 3.0 mm spacings. Test tape used was Tesa 4970. The ASTM test reports values from 0B to 5B, with 0B being a total failure, and 5B characterizing excellent adhesion.

Example 1

Synthesis of OH-Containing Michael Addition Resin I

Trimethylolpropane triacrylate (135.54 g, 0.4574 mole), 2-hydroxyethyl acrylate (53.11 g, 0.4574 mole), ethyl acetoacetate (54.11 g, 0.0307 mole), tetra-n-butylammonium bromide (2.41 g, 0.0075 mole), and glycidyl methacrylate (9.71 g. (0.0746 mole) were placed into 500 ml glass reactor. The reactor was capped with a cover equipped with mechanical stirrer, reflux condenser, and temperature monitoring thermocouple. The mixture was allowed to react, with stirring. Heat was applied in order to bring the temperature to 80° C. over a period of 50 minutes. The reaction mixture was then maintained at 80° C., for a period of five hours, until a constant refractive index (1.4796) was attained. The reaction mixture was cooled to 50° C. and 2.35 g. (0.0112 moles) ethylene glycol methacrylate phosphate (Ebecryl® 168, Trademark UCB) was added to quench the catalyst system. The reaction mixture was stirred at 50° C. for 15 minutes. The resin obtained had refractive index of 1.4796, a viscosity of 593 cP at 50° C., and an OH number of 109 mg KOH/g.

Example 2

Synthesis of Polyurethane Acrylate Ionomer I

Polypropylene glycol (121.79 g, 0.0622 mole; Pluracol® P2010, hydroxyl number=57.3, nominal molecular weight 2000) (Pluracol trademark BASF Corporation), dimethylolpropionic acid (16.67 g, 0.124 mole), 133.17 grams of acetone, and 0.24 grams of dibutyltin dilaurate were placed into a 1000 ml glass reactor. The reactor was capped with a cover equipped with mechanical stirrer, reflux condenser, temperature monitoring thermocouple, and an addition funnel. The funnel was fitted with a pressure-equalizing sidearm filled with 55.48 g. (0.2488 mole) isophorone diisocyanate (IPDI). The system was flushed thoroughly with dry nitrogen and maintained under a dry nitrogen blanket. The reactor contents were stirred and heated to raise the temperature to 45° C. over a period of 20 minutes. While holding the temperature at 45° C., the IPDI was added dropwise over one hour. Following addition of the IPDI, the temperature was raised to 60° C. over three hours. The reaction mixture was held at 60° C. until reaching an end point of 1.72% NCO (22 hours). The OH-Containing Michael Addition Resin I from Example 1 (72.65 g., 0.1244 mole) was then added gradually over ten minutes and the mixture was stirred and heated further. Phenothiazine (0.01 g) was added during this stage to prevent gelation. The reaction was monitored by FTIR. When the intensity at 2300 cm$^{-1}$ (—NCO band) attained a constant minimum (after 18 hours), the acetone was removed by vacuum distillation at 60° C. to a pressure of 40 mm Hg. The temperature of the resulting viscous resin was lowered to 45-50° C. and 25.10 g. (0.248 mole) triethylamine was added. After stirring and heating to 55° C. for ten minutes, 400.00 g. of deionized water was added and stirred in for an additional ten minutes. The product was a viscous translucent liquid comprising approximately a 40% resin aqueous dispersion. An aliquot of the dispersion was further diluted with deionized water to give a 30% aqueous dispersion. Both dispersions were stable when stored in the dark, at ambient conditions, for at least six months.

Example 3

Synthesis of Polyurethane Acrylate Ionomer II

Stage 1. A 1000 ml glass reactor was charged with 236.1 g. (0.476 equiv.) poly(neopentyl glycol adipate) (Fomrez 55-112, hydroxyl number=113.2; Fomrez is a trademark of Witco Chemical), 63.8 g. (0.951 equiv.) dimethylolpropionic acid, 238.1 g ethyl acetate, and 0.5 g dibutyltin dilaurate. The reactor was capped with a cover equipped with mechanical stirrer, reflux condenser, temperature monitoring thermocouple, and addition funnel with pressure-equalizing sidearm filled with 211.5 g. (1.91 equiv.) isophorone diisocyanate (IPDI). The system was flushed thoroughly with dry nitrogen and maintained under a dry nitrogen blanket. The reactor contents were stirred and heated to 65° C. in 30 minutes. While holding the temperature at 65° C., the IPDI was added dropwise over 45 minutes. The reaction temperature was then raised to 80° C. and monitored by FTIR. The reaction proceeded at 80° C. until the intensity at ~3600 cm$^{-1}$ (—OH band) was no longer observable and the NCO concentration reached 2.2%.

Stage 2. A 500 ml glass reactor was charged with 170.22 g. (0.08912 equiv.) of the Stage 1 product and 46.57 g. (0.09804 equiv.) of the OH— containing Michael Addition Resin I of Example 1. The reactor was capped with a cover equipped with mechanical stirrer, reflux condenser, and temperature monitoring thermocouple. The contents were stirred and heated to 60° C. in 40 minutes and held at that temperature until, as observed by FTIR, the ~2300 cm$^{-1}$ NCO band reached a minimum constant intensity (18 hours). Triethylamine (13.27 g., 0.1311 equiv.) and 419.91 g. deionized water were added and the ethyl acetate was removed by vacuum distillation at 380-430 mm. Hg and 60° C. The result was a slightly hazy aqueous dispersion containing about 30% resin, which was stable with no separation for at least six months at ambient conditions and away from light.

Example 4

Coating Properties of Polyurethane Acrylate Ionomer II

A film of the 30% aqueous Polyurethane Acrylate Ionomer II of Example 3 was drawn down on an aluminum Q Panel (Q-Panel® is a trademark of Q-Panel Lab Products, Cleveland, Ohio.), dried at 45° C. for 10-15 minutes, and cured under a Fusion 600 Watt/in. "H" bulb at 1,000 mJ/cm$^2$ UV dose. The resulting clear film was hard and tack-tree. It survived >200 water double rubs and 40 MEK double rubs.

Two formulations of the 30% dispersion of Polyurethane Acrylate Ionomer II were prepared as follows: 69% dispersion/31% Hubercarb Q6 calcium carbonate (Hubercarb is a registered trade name of J. M. Huber, Engineered Materials Sector) and 69% dispersion/31% Zeeospheres W-610 (3M Company) for coating commercial wood particle board. Each was drawn down on particle board in two 8-mil thick layers, drying at 50° C. after each application. The films were cured as described above to give ~3.5 mils thick, hard films. They exhibited excellent adhesion (0% removal) to substrate by a crosshatch adhesion test.

Example 5

Synthesis of OH-Containing Michael Addition Resin II

A water-soluble triacrylate, SR 9035, (40.5 g, 0.042 moles), 2-hydroxyethyl acrylate (HEA) (4.9 g, 0.042 moles), ethyl acetoacetate (EAA) (5 g, 0.385 moles), were added to a 100 mL reactor equipped with a magnetic stirrer and thermocouple. Glycidyl methacrylate (2,3-epoxypropyl methacrylate) 1.01 g, 2% w/w, 0.007 moles) and tetrabutyl ammonium bromide (0.252 g, 0.5 w/w) were added as co-catalysts. High-temperature induced gelation was inhibited by the addition of a pinch of phenothiazine. The reaction mixture was heated to 80° C. with a heating mantle and stirred for 4 h. The reaction yielded a clear, slightly yellow liquid of moderate viscosity. (Viscosity was measured using Brookfield viscometer) The liquid was transferred to an amber colored glass bottle for storage. Carbon-13 NMR confirmed that about 97% of the disubstituted EAA product was obtained. This resin cured tack-free at ~200 mJ/cm$^2$. However, the coating had very poor water resistance as measured by water double rubs using standard 1 lb. hammer.

Example 6

Synthesis of Polyurethane Acrylate Ionomer III

A 100 mL resin kettle equipped with a mechanical stirrer and a thermocouple was purged with nitrogen for about 2 minutes prior to loading. The purged kettle was charged with polyethylene glycol [MW=200)] (7.5 g, 0.0375 moles), dimethanol propionic acid (1.7 g, 0.0125 moles). Three drops of monochlorophenylphosphate were added as a water scavenger to prevent water catalyzed gelation of the urethane reaction Synthesis of urethane oligomers was started by slow addition of isophorone diisocyanate (IPDI), (22.2 g, 0.1 moles) and dibutyl tin laurate (2 drops). The exotherm was controlled to below 50° C. Water-soluble triacrylate, SR 9035 (2.4 g), was added to reduce the viscosity of reaction mixture. A pinch of phenothiazine added to prevent acrylate gelling at high temperature. At the conclusion of the addition, the resin was maintained under heat until more than 95% of the —OH groups were consumed as determined by infrared (FTIR) spectroscopy. At the end of 2 hours, —OH-containing Michael Addition Resin I, as synthesized in Example 1 (30.65 g, 0.0255 mole), and HEA (3 g, 0.0255 mole) were slowly added while maintaining the temperature at about 40° C. The reaction was allowed to continue overnight at room temperature. HEA (~1 g) and pinch of phenothiazine were added and the reaction continued at 40° C. for another hour until less than 2% of the —NCO groups remained as per FTIR. A sample of the resin was applied to an aluminum panel to check coating properties. The remaining resin was emulsified by stirring with triethylamine (0.6035 g) and water (70 g) to give a 30% dispersion of polyurethane acrylate ionomer. The white dispersion was stable for a few hours until the onset of phase separation.

Example 7

Coating Properties of Polyurethane Acrylate Ionomer III

An aliquot of the product from Example 6 was applied to an aluminum panel and cross-linked under UV light (600 W/inch "H" bulb lamp at a dosage of 840 mJ/cm$^2$). The resin cured to a clear, glossy, tack-free coating after flashing off the water in an oven. The coating had high solvent resistance (>200 MEK double rubs) as well as high water resistance (>200 water-double rubs).

Example 8

Synthesis of Amine-Modified Michael Addition Resin

A 1000 ml. glass reactor was charged with 501.61 g (1.1720 moles) SR 454 (ethoxylated trimethylolpropane triacrylate from Sartomer Company), 390.66 g. (0.3907 mole) Laromer PE 55 F (polyester diacrylate from BASF), 78.13 g. (0.6004 mole) ethyl acetoacetate, 4.98 g. (0.0155 mole) tetrabutylammonium bromide, and 19.92 g. (0.1402 mole) glycidyl methacrylate. The reactor was capped with a cover equipped with mechanical stirrer, reflux condenser, and temperature monitoring thermocouple. The stirred mixture was heated to 95° C. in one hour and held at that temperature until the refractive index of the mixture reached a constant value (1.4862 at 25° C.). Piperidine (4.69 g., 0.0551 mole) was then added and the reaction mixture was allowed to cool, with stirring, over 30 minutes to 70° C. The final resin had a refractive index of 1.4866 at 25° C. and a viscosity of 18,000 cP at 25° C.

Example 9

Cationic Acrylate Oligomer Emulsion and its Coating Properties

Into a four dram glass vial were weighed 2.00 g. of the Amine-Modified Michael Addition Resin prepared in Example 10, 1.00 g. deionized water and 0.03 g. glacial acetic acid. The mixture was shaken to give a white emulsion that remained stable for more than one hour.

A film of the emulsion was drawn down on an aluminum Q Panel, dried at 40° C. for 30 minutes, and cured under a Fusion 600 Watt/in. "H" bulb at 500 mJ/cm$^2$ UVA dose. The resulting clear film was hard and tack-tree. It survived >200 water double rubs and >200 MEK double rubs.

INCORPORATION BY REFERENCE

All publications, patents, patent application publications, and ASTM test methods cited in this specification are herein incorporated by reference, and for any and all purposes, as if each individual publication, patent, patent application publication, and/or ASTM test method were specifically and individually indicated to be incorporated by reference. In particular, the entire contents of co-pending applications Ser. Nos. 10/628,373, 10/722,478, 10/712,044, 10/682,874, 10/836,747, and 11/160,596 are herein incorporated by reference for any and all purposes. In the case of inconsistencies the present disclosure will prevail.

Having thus described our invention, what we claim as new, and desire to secure by Letters Patent is:

1. An ionic, self-photoinitiating multifunctional acrylate Michael resin comprising:
   at least one hydroxy-functional Michael resin and
   at least one ionic isocyanate-terminated urethane oligomer
   wherein said at least one hydroxy-functional Michael resin comprises a β-dicarbonyl monomer, a hydroxy-functional acrylate monomer and a multifunctional acrylate and
   wherein said at least one ionic isocyanate-terminated urethane oligomer comprises an isocyanate-reactive hydrophilic monomer, a polyol and at least one multifunctional isocyanate.

2. The ionic, self-photoinitiating multifunctional acrylate Michael resin, according to claim 1, wherein said ionic moiety is pendant from the backbone of said ionic, self-photoinitiating multifunctional acrylate Michael resin.

3. The ionic, self-photoinitiating multifunctional acrylate Michael resin, according to claim 1, wherein said isocyanate-reactivity comprises a chemical moiety selected from the group consisting of hydroxyl, primary amine, secondary amine, and thiol.

4. The ionic, self-photoinitiating multifunctional acrylate Michael resin, according to claim 3, wherein said isocyanate-reactive moiety is hydroxyl.

5. The ionic, self-photoinitiating multifunctional acrylate Michael resin, according to claim 3, comprising at least two isocyanate-reactive moieties.

6. The ionic, self-photoinitiating multifunctional acrylate Michael resin, according to claim 1, wherein said at least one ionic isocyanate-terminated urethane oligomer comprises a chemical moiety selected from the group consisting of carboxylate, sulfonate, ammonium, quaternary amine, and sulfonium.

7. The ionic, self-photoinitiating multifunctional acrylate Michael resin, according to claim 6, wherein said chemical moiety is carboxylate.

8. The ionic, self-photoinitiating multifunctional acrylate Michael resin, according to claim 1, wherein said isocyanate-reactive, hydrophilic monomer is chosen from the group consisting of dimethylolpropionic acid, bis(hydroxymethyl) butyric acid, N,N-bis(2-hydroxyethyl)glycine, hydroxypivalic acid, malic acid, glycolic acid, and lactic acid.

9. The ionic, self-photoinitiating multifunctional acrylate Michael resin, according to claim 8, wherein said isocyanate-reactive, hydrophilic monomer is dimethylolpropionic acid.

10. The ionic, self-photoinitiating multifunctional acrylate Michael resin, according to claim 1, wherein said polyol is selected from the group consisting of polyether polyols and polyester polyols.

11. The ionic, self-photoinitiating multifunctional acrylate Michael resin, according to claim 10, wherein said polyol is selected from the group consisting of poly(neopentyl glycol) adipate, polypropylene glycol, and polyethylene glycol.

12. The ionic, self-photoinitiating multifunctional acrylate Michael resin, according to claim 10, wherein said polyol comprises terminal hydroxyl groups.

13. The ionic, self-photoinitiating multifunctional acrylate Michael resin, according to claim 1, wherein said multi-functional isocyanate is selected from the group consisting of aliphatic, cycloaliphatic, and aromatic isocyanates.

14. The ionic, self-photoinitiating multifunctional acrylate Michael resin, according to claim 13, wherein said polyisocyanate is selected from the group consisting of dicyclohexylmethane diisocyanate, isophorone diisocyanate (IPDI), and 2,2,4-trimethylhexamethylene diisocyanate (TMDI).

15. The ionic, self-photoinitiating multifunctional acrylate Michael resin, according to claim 1, wherein said β-dicarbonyl monomer is selected from the group consisting of β-keto esters, β-diketones, β-keto amides, and β-ketoanilides.

16. The ionic, self-photoinitiating multifunctional acrylate Michael resin, according to claim 15, wherein said β-dicarbonyl monomer is selected from the group consisting of ethyl acetoacetate, 2,4-pentanedione, and acetoacetanilide.

17. The ionic, self-photoinitiating multifunctional acrylate Michael resin, according to claim 1, wherein said hydroxy-functional acrylate monomer is selected from the group consisting of 2- hydroxyethyl acrylate (HEA), 2-hydroxypropyl acrylate (HPA), 4-hydroxybutyl acrylate, 2-hydroxybutyl acrylate, caprolactone acrylate, polyethylene glycol monoacrylate, polypropylene glycol monoacrylate, and mixtures thereof.

18. The ionic, self-photoinitiating multifunctional acrylate Michael resin, according to claim 17, wherein said hydroxy-functional acrylate monomer is 2-hydroxyethyl acrylate (HEA).

19. The ionic, self-photoinitiating multifunctional acrylate Michael resin, according to claim 1, wherein said multifunctional acrylate is selected from the group consisting of diacrylates, triacrylates, tetraacrylates, and pentaacrylates.

20. The ionic, self-photoinitiating multifunctional acrylate Michael resin, according to claim 19, wherein said multifunctional acrylate comprises a diacrylate and said diacrylate is selected from the group consisting of: ethylene glycol diacrylate, propylene glycol diacrylate, diethylene glycol diacrylate, dipropylene glycol diacrylate, triethylene glycol diacrylate, tripropylene glycol diacrylate, tertraethylene glycol diacrylate, tetrapropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1, 3-propanediol diacrylate, 1, 4-butanediol diacrylate, 1, 5-pentanediol diacrylate, 1, 6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, acrylated epoxy diacrylates, aryl urethane diacrylates, aliphatic urethane diacrylates, polyester diacrylates, and mixtures thereof.

21. The ionic, self-photoinitiating multifunctional acrylate Michael resin, according to claim 19, wherein said multifunctional acrylate comprises a triacrylate and said triacrylate is selected from the group consisting of: trimethylol propane triacrylate, glycerol triacrylate, ethoxylated trimethylo lpropane triacrylate, propoxylated trimethylo lpropane triacrylate, tris (2-hydroxyethyl) isocyanurate triacrylate, ethoxylated glycerol triacrylate, propoxylated glycerol triacrylate, pentaerythritol triacrylate, aryl urethane triacrylates, aliphatic urethane triacrylates, melamine triacrylates, aliphatic epoxy triacrylates, epoxy novolac triacrylates, polyester triacrylates and mixtures thereof.

22. The ionic, self-photoinitiating multifunctional acrylate Michael resin, according to claim 19, wherein said multifunctional acrylate comprises a tetraacrylate and said tetraacrylate is selected from the group consisting of: di-trimethylolpropane tetraacrylate, pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetraacrylates, aliphatic urethane tetraacrylates, melamine tetraacrylates, epoxy novolac tetraacrylates, and mixtures thereof.

23. The ionic, self-photoinitiating multifunctional acrylate Michael resin, according to claim 19, wherein said multifunctional acrylate comprises a pentaacrylate and said pentaacrylate is selected from the group consisting of: dipentaerythritol pentaacrylate, melamine pentaacrylate, and mixtures thereof.

24. The ionic, self-photoinitiating multifunctional acrylate Michael resin, according to claim 1, comprising: a β-dicarbonyl monomer having a central methylene carbon; at least two multifunctional acrylates Michael added to said carbon; and at least one secondary amine added to at least one of said acrylates.

25. The ionic, self-photoinitiating multifunctional acrylate Michael resin, according to claim 24, wherein said β-dicarbonyl monomer having a central methylene carbon is selected from the group consisting of β-keto esters, β-diketones, β-keto amides, and β-ketoanilides.

26. The ionic, self-photoinitiating multifunctional acrylate Michael resin, according to claim 25, wherein said β-dicarbonyl monomer is selected from the group consisting of ethyl acetoacetate, 2,4-pentanedione, and acetoacetanilide.

27. The ionic, self-photoinitiating multifunctional acrylate Michael resin, according to claim 24, wherein said at least one secondary amine comprises: a nitrogen covalently linked to two organic radicals, wherein each said radical is selected from the group consisting of linear and branched alkyl, linear and branched alkenyl, and linear and branched alkynyl.

28. The ionic, self-photoinitiating multifunctional acrylate Michael resin, according to claim 24, wherein said at least one secondary amine comprises a heterocyclic secondary amine.

29. The ionic, self-photoinitiating multifunctional acrylate Michael resin, according to claim 24, wherein said secondary amine is diethanolamine.

30. A substrate coated with the ionic, self-photoinitiating multifunctional acrylate Michael resin, according to claim 1.

* * * * *